May 5, 1953          H. F. NELSON          2,637,760
STORAGE BATTERY TESTING AND FILLING APPARATUS
Filed Feb. 20, 1950          3 Sheets-Sheet 1
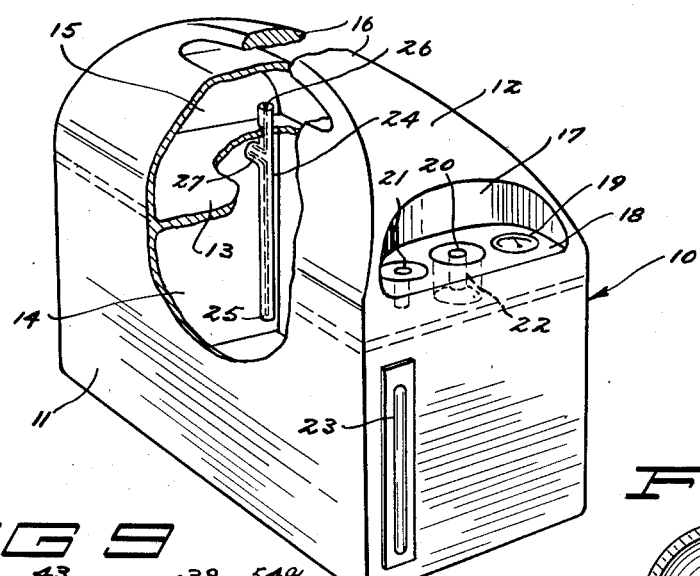
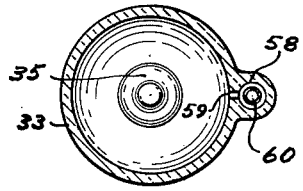
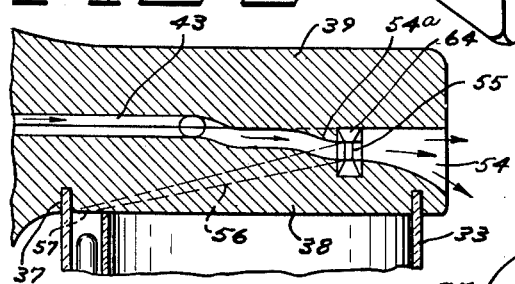
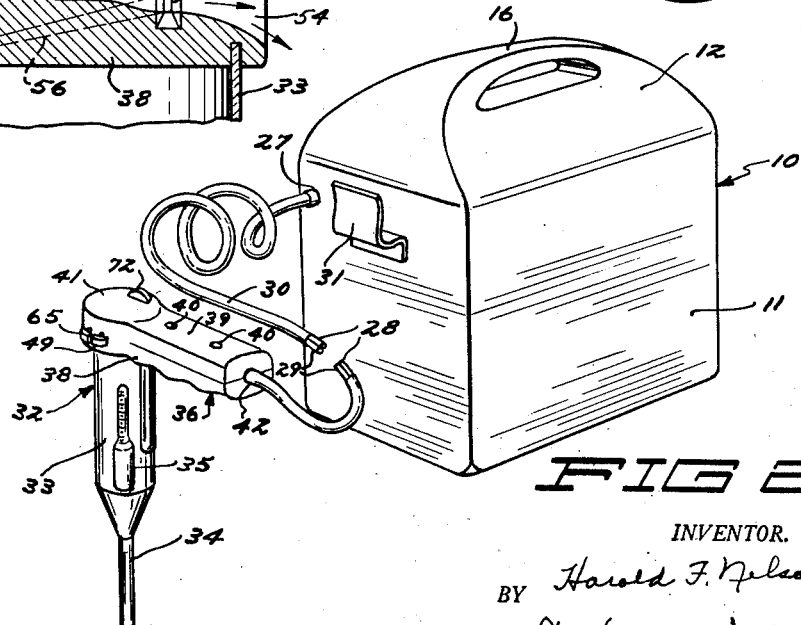
INVENTOR.
BY Harold F. Nelson
Carlsen + Hagle
Attorneys May 5, 1953 H. F. NELSON 2,637,760
STORAGE BATTERY TESTING AND FILLING APPARATUS
Filed Feb. 20, 1950 3 Sheets-Sheet 2
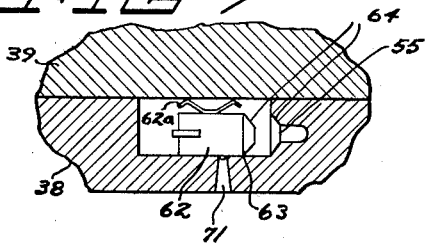
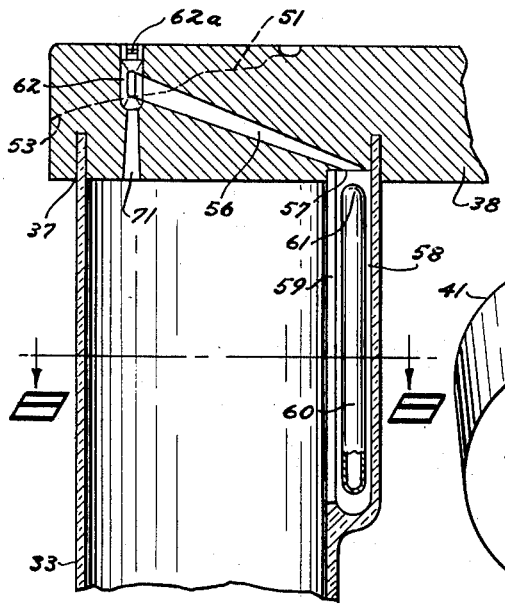
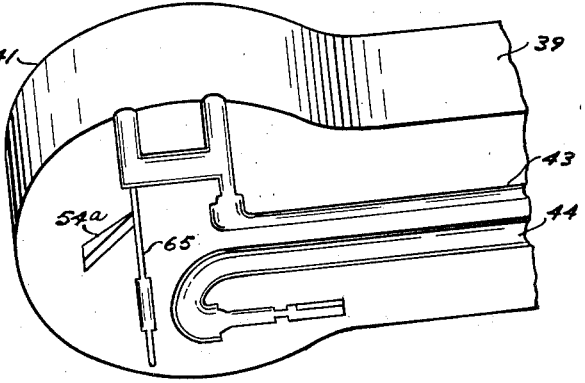
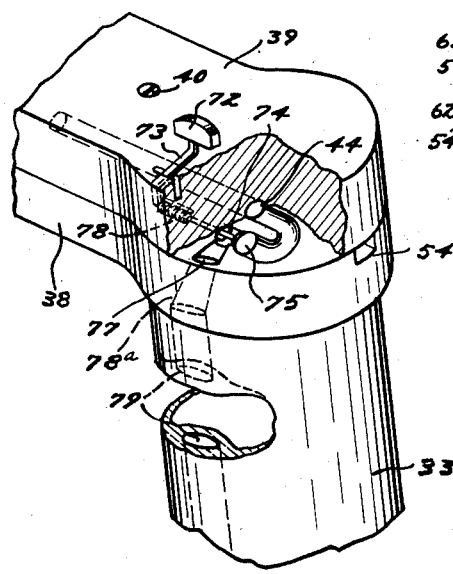
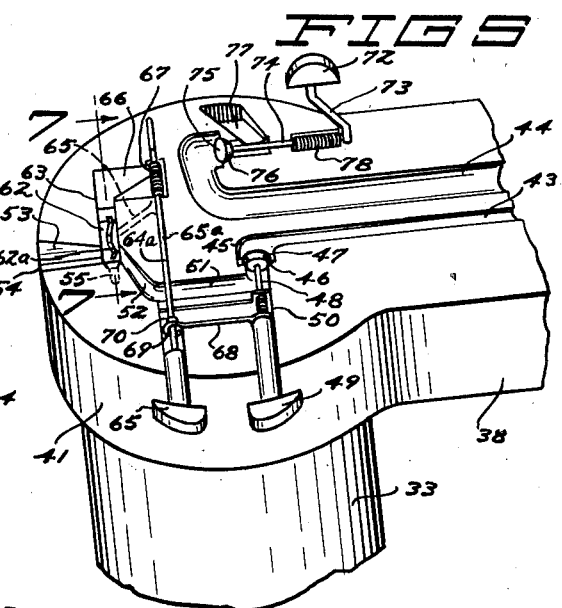
INVENTOR.
Harold F. Nelson
BY Carlsen & Hozk
Attorneys

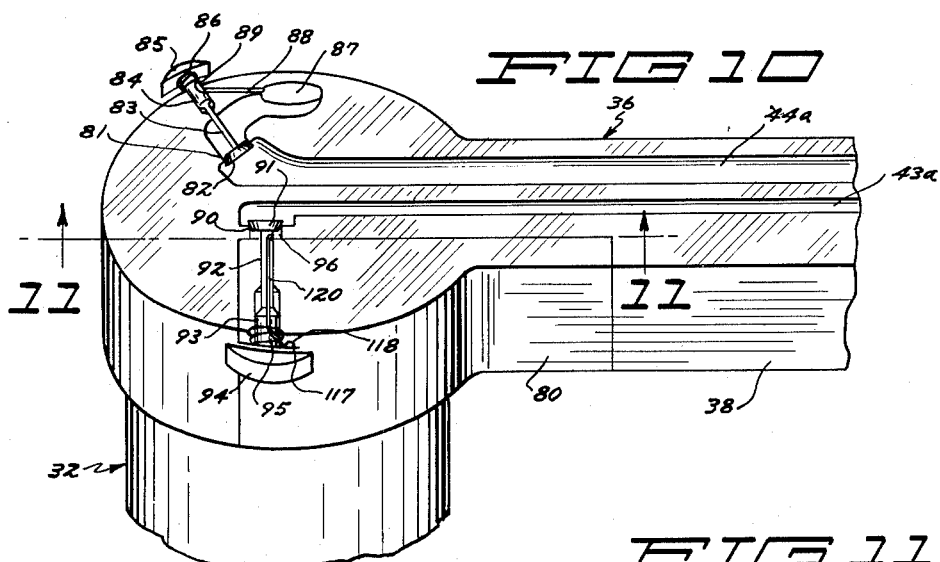
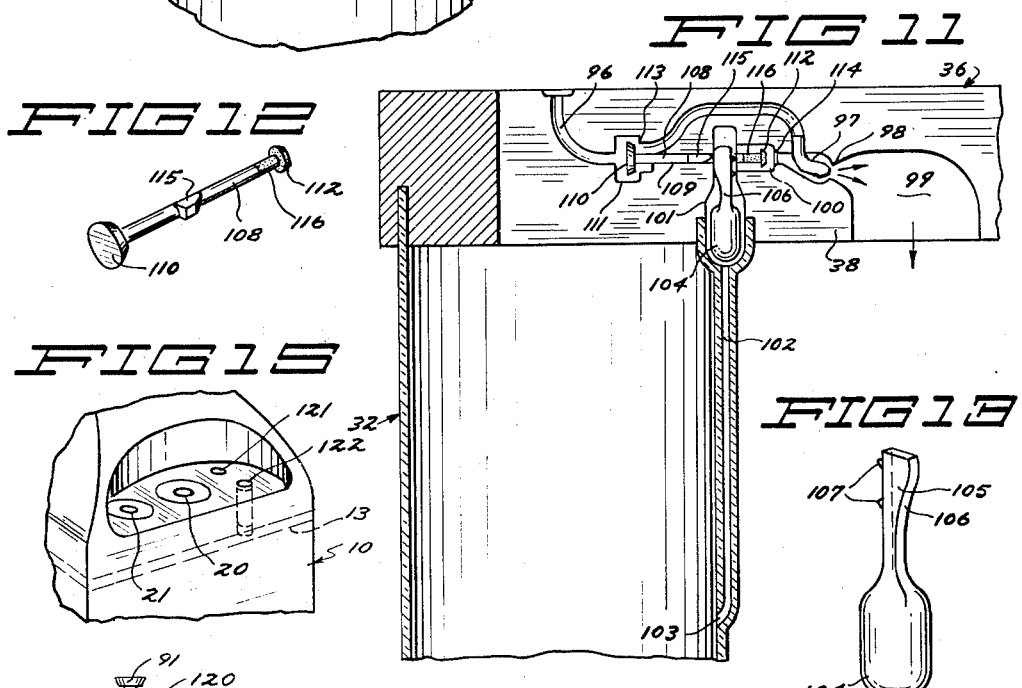
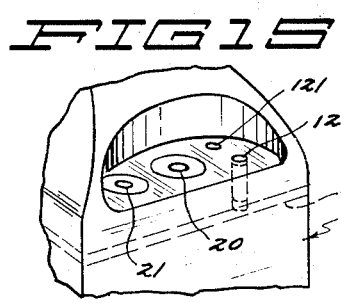
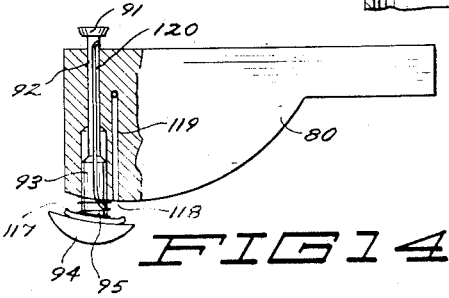

Patented May 5, 1953

2,637,760

UNITED STATES PATENT OFFICE 2,637,760

STORAGE BATTERY TESTING AND FILLING APPARATUS

Harold F. Nelson, St. Paul, Minn.

Application February 20, 1950, Serial No. 145,215

19 Claims. (Cl. 136—182)

This invention relates to devices or apparatus for testing and filling purposes and, while it is of particular utility for accomplishing this work in service stations where the batteries of automotive vehicles are serviced, I do not limit myself to this use alone.

The primary object of the invention is to provide a device for these purposes which is operated by compressed air, a source of which is found around every service station, and to provide an apparatus in which all of the elements and materials necessary for testing the specific gravity of the battery acid and for filling the battery, if necessary, with distilled water are grouped for convenient and straightforward operation. At present it is necessary for the service man to first test the battery by use of a hydrometer and then if necessary to fill the battery from a separate container so that different tools or elements are used in the operation, and it will be thus apparent that by grouping all of these parts and materials, I save a number of operations and greatly facilitate the work.

Another object of my invention is to provide an apparatus of the above character which is simple and compact in construction, making it readily portable, and in which the various operations are controlled by a group of valves all conveniently arranged on a hand piece or handle for operation by one hand and with the hydrometer associated with the same handle.

Another object of my invention is to provide a hydrometer operated by compressed air in such manner as to create a suction in the hydrometer to draw up the electrolyte or acid in the battery and with an automatic shut off operated according to the level of the acid in the hydrometer to limit the level to which the acid will be drawn thereinto.

These and other more detailed and specific objects will be disclosed in the course of the following specification reference being had to the accompanying drawings, in which—

Fig. 1 is a perspective view of the container portion of my apparatus wherein supplies of compressed air and distilled water are contained and with a portion of the housing broken away to disclose interior details of construction.

Fig. 2 is a perspective view of the complete apparatus, including the hydrometer and associated connections, and viewing the container at the end opposite that of Fig. 1.

Fig. 3 is a diametrical cross sectional view of the upper portion of the hydrometer and associated part of the hand piece or handle and particularly showing the suction passage and the acid level responsive shut-off for the suction.

Fig. 4 is a perspective view looking at the underside of the upper section of the hand piece or handle.

Fig. 5 is a similar view but looking downwardly at the upper section of the hand piece and showing the three valves associated therewith.

Fig. 6 is a perspective view, on a smaller scale, of adjacent portions of the hydrometer and handle with an upper part of the latter broken away to show the filling valve and a section of the hydrometer barrel or casing broken out in section to show the duct through which the distilled water is led to the battery.

Fig. 7 is a fragmentary sectional view taken substantially along the line 7—7 in Fig. 5.

Fig. 8 is a cross section on a reduced scale taken along the line 8—8 in Fig. 3.

Fig. 9 is a vertical diametrical sectional view through the upper part of the hydrometer and handle, viewing the same in the opposite direction from that shown in Fig. 3, and particularly showing the air line suction opening and suction passage by which suction is created in the hydrometer to draw up acid from the battery.

Fig. 10 is a view similar to Fig. 5 viewing the hand piece in perspective from above and disclosing a modification of my invention using two instead of three hand operated valves and thumb pieces.

Fig. 11 is a side elevation and section taken substantially along the line 11—11 in Fig. 10.

Fig. 12 is a perspective view of the vacuum shut-off valve as removed from the assembly.

Fig. 13 is a perspective view of the float and actuator for the valve shown in Fig. 12.

Fig. 14 is a plan view partially in section of a part of the hand piece and disclosing the vacuum controlling valve as well as the port by which the hydrometer barrel is vented after a specific gravity reading is made.

Fig. 15 is a fragmentary perspective view of a part of the container as shown in Fig. 1 but illustrating the use of relief valves instead of the air pressure gauge as previously disclosed.

Referring now more particularly and by reference characters to the drawing, my apparatus as seen in Figs. 1 and 2 includes a container designated generally at 10 having a rectangular lower portion 11 and crowned upper portion 12 which are separated interiorly by a partition 13 to provide a lower chamber or tank 14 for distilled water and an upper chamber 15 for compressed air. This container may be conveniently made as a portable device with a handle 16 but I, of course, do not limit myself to this or to the specific details of the construction. At one end the upper part 12 of the container 10 is recessed at 17 forming a panel portion 18 wherein is located a gauge 19 to indicate the air pressure in chamber 15. The panel 18 is also provided with filling means 20 and 21 through which the lower chamber 14 may be filled with distilled water and the upper chamber 15 supplied with compressed air from the usual service station air supply. While the details of these means 20 and 21 are immaterial to my invention, it may be noted that the means 20 includes a plug and associated valve 22 through which compressed air may be introduced to the lower chamber 14 in order to place the chamber under pressure and expel distilled water when required. When the plug and valve 22 are removed access is had to the chamber 14 for putting in water. A conventional water gauge 23 is also provided upon this end of the container to indicate the level of the distilled water while at the opposite end of the container there is provided a tubular fitting 24 having a lower inlet 25 to the water chamber 14 and an upper inlet 26 to the compressed air chamber 15. A branch 27 of this fitting leads out through the adjacent end of the container 10 and separate flexible tubes 28 and 29 are connected to this branch 27 to communicate respectively with the inlets 25 and 26 and thus carry compressed air and distilled water away from the container. Preferably, the tubes 28 and 29 are enclosed in a common sheath 30 as seen in Fig. 2. Also, as there shown, this end of the container is provided with a bracket or hook 31 upon which the tubes and associated hydrometer device may be hung when the apparatus is not in use as will be readily understood.

For use in conjunction with the sources or supplies of compressed air and distilled water under pressure as thus provided by the container 10, my invention also provides a hydrometer device, which is designated generally at 32. This device conventionally includes a transparent hydrometer barrel or cylinder 23 tapered at its lower end to form a spout 34 for convenient insertion in the battery cell and containing a float 35 to indicate the specific gravity of acid drawn from the battery cells up into the barrel. The hydrometer is, however, of special construction in some respects as will presently be made clear, and instead of the usual bulb with which such devices are fitted, I provide a hand piece or handle designated generally at 36 into one lower end portion of which the upper end of the barrel 33 is fitted air tight as indicated at 37 in Figs. 3 and 9. The hand piece 36 contains a number of valves and operating elements as will also be presently described, and for most convenient fabrication and assembly is made up of upper and lower sections 38 and 39 demountably secured together by means of screws indicated at 40. Preferably, the hand piece is widened and rounded at its head end 41 at which it is fitted to the hydrometer barrel, and extends for some distance radially of the barrel to form a convenient hand grip portion as clearly shown throughout the drawing.

The tubes 28 and 29 previously described enter the end of this hand grip portion of the hand piece 36 as shown at 42 in Fig. 2 and they communicate with compressed air and distilled water passages, designated at 43 and 44, which extend generally longitudinally of the handle and are formed in mating relation in the meeting surfaces of the upper and lower portions 38 and 39 thereof. The compressed air passage 43 as it reaches a point over the hydrometer barrel 33 turns at right angles at 45 and is formed with a beveled seat 46 of reduced diameter cooperating with a valve 47, which is of the poppet type and is shown in Fig. 5. The valve 47 has an operating stem 48 formed at the inner end of a thumb piece 49 projecting laterally from the head portion 41 of the hand piece, and an expansion coil spring 50 is arranged upon the stem in such manner as to normally and yieldably bias the valve to its closed position on the seat 46. The seat 46 communicates with a passage 51 extending in the same direction as the main compressed air passage 43 but offset laterally thereof, and this passage 51 at some distance from the seat turns angularly inward as shown at 52 and then outward radially at 53 to finally open through the head or extremity of the handle above the hydrometer barrel 33 as shown at 54 in Figs. 6 and 9. The portions 51 and 52 of the compressed air passage, after leaving the valve seat 46, angle downwardly into the lower section 38 of the hand piece (as shown in Fig. 9 to best advantage) and to reduce the cross sectional area of the passage 52 toward the point in which it bends in the escape passage 53 a rib 54$^a$ is cast or molded in a depending position upon the upper handle portion 39 to fit into the passage 52. The escape passage 53, on the other hand, increases in cross section toward the point at which it opens at 54 through the end of the handle.

It will be apparent that, as thus far described, the opening of the valve 47 by an inward pressure upon the thumb piece 49 will permit compressed air in the passage 43 to flow around through the passages 51 and 52 and finally to emerge through the escape passage 53 and opening 54. The travel of this air around the junction of the passages 52 and 53 is utilized to create a vacuum or suction in the hydrometer barrel 33 when the spout end thereof is inserted into the battery and for this purpose I provide at such junction a suction opening 55 which communicates with a suction passage 56 formed in the lower section 38 of the handle, and angling downwardly therein in a direction opposite to the air travel, to finally open at 57 through the lower face of the handle. Attention is called to the fact that the suction opening 55 enters the junction of the passages 52 and 53 at right angles to the direction at which the air flows past so that the onrushing air will create a powerful suction by an air jet action. This action is also assisted by the fact that the escape passage 53 increases rapidly in size beyond the suction opening in order to increase velocity and reduce the pressure in a fashion somewhat similar to the operation of the well known Venturi chamber.

At this point attention is directed particularly to Figs. 3 and 9 wherein it will be noted that the hydrometer barrel 33 is formed with a cylindrical vertical float chamber 58 with the upper end of which the opening 57 aforesaid is aligned. The float chamber 58 communicates with the interior of the hydrometer barrel by means of a vertical slot 59 in the inner wall of the chamber and positioned in the chamber is an elongated tubular float 60 with a rounded upper end 61. The purpose of this arrangement is to automatically shut off the suction or vacuum being pulled through the passage 56 and opening 57, as previously described, when the rising level of acid in the hydrometer barrel 33 reaches a desired maximum. It will be readily understood that this acid as it nears the upper portion of the barrel will enter the float chamber 58 through the slot 59 causing the float to rise until its upper end 61 seats in and closes the opening 57. As this occurs the suction will, of course, be automatically shut off but will remain in the hydrometer barrel to hold the acid therein until a reading has been made. By this simple construction I prevent any flooding of the hydrometer and associated parts even should the operator keep his hand upon the valve thumb piece 49 beyond the time necessary to draw up an adequate level into the barrel.

After a reading of the specific gravity has been made it is, of course, necessary to return the acid to the battery and for this purpose I provide a slide valve or return valve 62 which reciprocates in a recess 63 in the lower handle section 38 in such direction that the valve may move toward and away from the suction opening 55. This opening and adjacent end of the valve 62 are beveled off, as indicated at 64, so that when they meet the suction opening will be closed. For operating the valve 62 I provide a stem 64ᵃ slidably mounted parallel with the compressed air valve stem 48 and provided at its outer end with a thumb piece 65 located adjacent the thumb piece 49. The stem 64ᵃ is located in channel 65ᵃ formed in the handle sections 38 and 39 at some distance from the valve 62 but the stem is connected thereto by means of an angularly and laterally extending arm 65 connecting valve and stem. A correspondingly shaped and angled cavity 66 is formed in the lower hand section 38 to provide clearance for movement of the arm 65 and an expansion coil spring 67 is located in this recess around the valve stem in such manner as to normally urge the valve 62 to its seat. In order to permit the flow of compressed air past the suction opening 55, upon the opening of the valve 47 by the thumb piece 49, I provide the stem 48 of that valve with a lateral arm 68 having an end 69 looped around the stem 65 and adapted to contact a button 70 thereon. Thus as shown in Fig. 5, the inward movement of the thumb piece 47 to unseat the valve 47 will result in a corresponding movement of valve stem 44 through an initial range, such as to also move the valve 62 clear of the suction opening as required. When a specific gravity reading has been made the operator transfers his thumb to the thumb piece 65 in order to move the valve stem 64 through a second range in the same direction and the result of which is to uncover a vent port 71 leading from the cavity 63 and downwardly opening through the lower face of the handle into the upper end of the hydrometer barrel 33 as shown in Figs. 3 and 7. The valve 62 is held down in the recess and tight against the port 71 by a spring 62ᵃ clearly shown in Fig. 7. When this port 71 is thus opened it admits air under atmospheric pressure from the escape passage 53 to the interior of the barrel 33 so that the acid will flow from the hydrometer readily and quickly, as will be understood.

Following the testing of the battery and the return of the acid from the hydrometer as described above, the battery may be filled if required by the actuation of a thumb piece 72 which projects from the upper surface of the rounded end 41 of the hand piece, and this thumb piece has a shank 73 which extends downwardly into the upper handle section 39 for connection to a valve stem 34 carrying a poppet type water valve 75. The water passage 44, as it reaches the rounded end of the hand piece, is looped back on itself and formed with a seat 76 cooperating with the valve 75 to control the entry of water into a chamber 77 in the hand piece as shown in Fig. 5. An expansion spring coil 78 upon the valve stem 74 normally holds the valve 75 in its closed position but slide movement of the thumb piece 72 will open the valve and permit the water (which is under pressure as previously described) to flow into the chamber 77 as long as the valve is held open. The chamber 77 communicates with a downwardly open passage 78ᵃ in the lower section 38 of the hand piece, which in turn, communicates with a duct 79 formed in the inside of the hydrometer barrel 33 and extending downwardly to open through the lower end of the hydrometer spout 34. It will thus be apparent that the distilled water may be conducted into the battery through the spout. As shown to best advantage in Figs. 4 and 5, the facing surfaces of the upper and lower hand piece sections 38 and 39 are recessed wherever necessary to accommodate the various operating parts but since such arrangements are conventional, particularly where the parts are molded as would no doubt be the case here, all of these elements and cavities are not described in detail.

In the use and operation of the apparatus, it may be readily carried about from place to place as required since it is relatively small and compact in weight, and the operator by grasping the hand piece 36 may insert the hydrometer in a battery cell and in one almost continuous straightforward series of operations may draw acid from the battery, make a reading of the specific gravity, return the acid to the battery, and finally fill each cell with distilled water, if such is needed. The operations are carried out and controlled by the sequential operation of the valve thumb pieces 49, 65, and 72 all of which are grouped for convenient operation by the thumb (or finger) of the same hand which manipulates or positions the hydrometer itself. In fact, the apparatus is completely automatic and is rendered so not only by the simplicity of the operations required, but by the automatic shut off afforded by the float 60 to limit the upper level of the acid drawn into the hydrometer. Other objects and features of the operation will be understood to those skilled in the art without further description herein, and as stated at the outset I do not limit myself to the use of the device for testing and filling storage batteries alone, the apparatus conceivably having utility wherever testing and/or filling operations of analogous nature are carried out.

The device as disclosed hereinbefore requires the use of three separate hand operated valves, having the respective thumb pieces 49, 65, and 72, but I may by the modification disclosed in Figs. 10 through 14 reduce the number of such valves to two in all as will now be described. In this modification the hand piece 36 and hydrometer 32 are essentially identical to the corresponding parts previously described with the exception that the lower section 38 of the hand piece is provided with a removable and irregularly shaped lateral section 80 to facilitate the molding and machining of the various cavities necessary for the installation of the valves and the transmission of the air pressures as will be readily understood.

In this modification the passage 44ᵃ through which the distilled water is supplied is formed with a valve seat 81 with which cooperates a poppet-type valve 82 at the inner reduced end of a valve stem 83 extending radially outward through one side of the head portion of the handle. The valve stem has an enlarged outer portion 84 to which is affixed a thumb piece 85 and an expansion coil spring 86 is arranged to normally urge the valve 82 to its seat. When the thumb piece 85 is pressed inward, however, the valve is unseated and the water may pass downwardly into a passage 87 corresponding to the previously described passage 77 by which the water is admitted to the duct 79 leading downwardly inside the hydrometer barrel to thus supply the water to the battery as needed. In addition, I provide a small duct 88 leading from the passage 87 to a notch 89 formed in the enlarged portion 84 of the valve stem, the purpose of which is to vent those portions of the water supply passages beyond the valve 82 to atmosphere. Thus any pressure remaining in these passages following the closing of the valve 82 will be relieved when the thumb piece 85 is released in shutting off the valve.

The passage 43$^a$ through which compressed air is supplied in order to form a vacuum to draw acid from the battery up into the hydrometer terminates at a valve seat 90 upon which is normally seated a poppet-type valve 91 formed at the inner reduced end of a valve stem 92. This valve stem 92 extends outward radially to the lateral section 80 of the hand piece and has an enlarged outer end 93 upon which is secured a thumb piece 94. Here again an expansion coil spring 95 is arranged to normally seat the valve 91 but by inward pressure upon the thumb piece 94 the valve will open allowing compressed air to flow into a passage indicated at 96. As best shown in Fig. 11 this passage 96 takes a tortuous course back within the hand piece and terminates finally at a small Venturi jet tube 97 from which the compressed air will issue through the throat 98 of an exhaust recess indicated at 99. The recess 99 communicates through a chamber 100 with a vertical float chamber 101 and the latter chamber in turn communicates with a passage 102 leading downward through the adjacent wall of the hydrometer barrel and opening into the interior thereof at 103. Loosely positioned in the chamber 101 is a float 104 terminating at its upper end in a cam piece 105 having a rounded cam surface or edge 106. As thus far described, the arrangement is obviously such that the Venturi jet effect of the compressed air flowing through the throat 98 will create a vacuum or suction in the chambers 100 and 101 in such fashion as to pull up acid from the battery into the hydrometer. As the acid rises to the proper level for taking a specific gravity reading, it will operate through the passage 102 upon the float 104 moving it upward in the chamber 101 from the position shown in Fig. 11 until the upper end of the cam piece 105 strikes the upper end of said chamber. It will be noted that I provide upon the edge of the cam piece opposite the cam surface 106 a pair of points 107, the purpose of which is to ride the adjacent surface of the chamber 101 and reduce the frictional resistance to the movements of the float.

Cooperating with the float and cam is a shut-off valve having an elongated stem 108 slidable in the passage 109 and having a valve 110 at one end operating in an enlargement 111 of the passage 96. At its opposite end the stem 108 has a second valve 112 operating in the aforesaid chamber 100 and these valves 110 and 112 cooperate with seats indicated at 113 and 114, respectively, being normally held clear of said seats by the contact of the cam surface 106 with a cam lug 115 projecting laterally from the valve stem. This is clearly shown in Fig. 11 and it will also be apparent there that the valve stem 18 is laterally off-set in order to clear the cam piece 105. Now as the float 104 is moved upward, which occurs when the acid reaches the desired level in the hydrometer barrel, the upward travel of the cam surface 106 will permit the valve stem 108 to move to the right, as viewed in Fig. 11, until the valves 110 and 112 contact the respective seats 113 and 114. Such movement of the valve stem is, of course, brought about by the pressure of the compressed air flowing through the passage 96 against the face of the valve 110 and in order that both valves may seat properly I support the valve 112 upon the stem 108 by means of a soft rubber ferrule 116 having sufficient axial yieldability for this purpose.

It will, of course, be obvious that as the valves 110 and 112 assume their seats they will cut off the flow of compressed air to the Venturi throat 98, shutting off the vacuum and also isolating the chamber 101 and interior of the hydrometer so as to retain the suction therein and hold the acid in the hydrometer until the reading is made. This action is brought about automatically as the acid level reaches the desired point and takes place while the thumb piece 94 is still pushed in to hold the valve 91 open.

Immediately inside the thumb piece 95 there is provided a soft rubber seal or gasket 117 and when the thumb piece is pushed in this seal closes the outer end 118 of an L-shaped vent passage 119 leading downwardly through the underside of the hand piece and opening into the interior of the hydrometer barrel. It will now be apparent that when the thumb piece 94 is released, following the taking of a specific gravity reading, the spring 95 will urge the thumb piece outward, closing the valve 91 and at the same time exposing the end 118 of the vent passage 119. Air at atmospheric pressure can then rush into the interior of the hydrometer barrel to relieve the vacuum therein and permit the acid to return to the battery upon which the float 104 will return to its lower position shown in Fig. 11 and the cam surface 106 will actuate the cam lug 115 to move the stem 108 to the left and reopen both valves 110—112 ready for the next operation. Any remaining air pressure in the passage 96 will be vented by means of a groove 120 formed along the valve stem 92—92 and at its outer end exposed to atmosphere when the thumb piece 94 is in its normal or non-operated position as will be readily understood. It will thus be apparent that the valve operated by thumb piece 94 fulfills the dual functions of controlling the admission of compressed air to the suction producing Venturi throat and venting the interior of the hydrometer after the reading has been made. A material simplification of the construction and operation is thus achieved.

I have previously described the container portion of the apparatus, as shown in Fig. 1 to best advantage, as provided with a gauge 19 for reading the air pressure therewithin. I may prefer to dispense with this gauge and as seen in Fig. 15 provide a pair of conventional relief valves 121 and 122 communicating respectively with the chambers 14 and 15 within the container. The operator may then supply air to these chambers until the relief valves 121—122 open indicating that a desired pressure has been reached and without the necessity of watching the operation of an air gauge.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A portable apparatus for testing and filling storage batteries, comprising a hydrometer device for testing the battery, means operated by compressed air for drawing acid from the battery into the hydrometer device to make a test thereof, means for then returning the acid to the battery, the apparatus including a supply of distilled water under pressure, and means associated with the hydrometer device for supplying the water to the battery according to need.

2. Apparatus of the character described for testing and filling storage batteries and analogous uses and for use in conjunction with a source of compressed air, comprising a hydrometer, means operated by the compressed air to develop a vacuum in the hydrometer and thereby draw acid from the battery for testing, means for returning the acid to the battery after the test, a supply of distilled water, means for supplying the water to the battery, and means responsive to the level of acid drawn into the hydrometer for cutting off the vacuum and holding the acid at a predetermined level.

3. In an apparatus for servicing storage batteries and for use in conjunction with a source of compressed air, the combination comprising a hydrometer, a hand piece for manipulating the hydrometer, a container having a compressed air supply and a distilled water supply, flexible means connecting the hand piece to said container, means operated by the compressed air for creating a suction in the hydrometer to draw up acid from a battery for testing, means for shutting off the suction and venting the hydrometer to atmosphere to permit the acid to return to the battery, and means also operated by compressed air for filling the battery as required with water from the container.

4. In an apparatus for servicing storage batteries and for use in conjunction with a source of compressed air, the combination comprising a hydrometer, a hand piece for manipulating the hydrometer, a container for carrying a compressed air supply and a distilled water supply, flexible fluid carrying means connecting the handpiece to said container, means operated by the compressed air for creating a vacuum in the hydrometer to draw up acid from a battery for testing, means for halting the vacuum and venting the hydrometer to atmosphere to permit the acid to return to the battery, and means also operated by compressed air for filling the battery as required with water from the container, the said last three mentioned means including separate manually operative control valves on said handpiece.

5. For testing and filling storage batteries, a portable apparatus comprising a container for supplies of compressed air and distilled water, a hydrometer having a handle, flexible connections between the handle and the compressed air and water supplies, means operated by the compressed air and including a valve on the handle for creating a suction in the hydrometer as it is lowered into a battery to thereby draw up acid for testing, means including a second valve on the handle for venting the hydrometer to atmosphere to permit the return of the acid to the battery after testing, and means including a third valve on the handle for delivering water from the supply to the battery.

6. For testing and filling storage batteries, apparatus comprising a container for supplies of compressed air and distilled water, a hydrometer having a handle, flexible connections between the handle and the compressed air and water supplies, means operated by the compressed air and including a valve on the handle for creating a suction in the hydrometer as it is lowered into a battery to thereby draw up acid for testing, means including a second valve on the handle for venting the hydrometer to atmosphere to permit the return of the acid to the battery after testing, and means including a third valve on the handle for delivering water from the supply to the battery, the said water container having a connection for receiving compressed air to force the water into the battery when the third valve is operated.

7. For testing and filling storage batteries, apparatus comprising a container for supplies of compressed air and distilled water, a hydrometer having a handle, flexible connections between the handle and the compressed air and water supplies, means operated by the compressed air and including a valve on the handle for creating a suction in the hydrometer as it is lowered into a battery to thereby draw up acid for testing, means including a second valve on the handle for venting the hydrometer to atmosphere to permit the return of the acid to the battery after testing, means including a third valve on the handle for delivering water from the supply to the battery, and float controlled means for closing off the suction to the hydrometer when the acid level therein reaches a predetermined point.

8. For testing and filling storage batteries, apparatus comprising a container for supplies of compressed air and distilled water, a hydrometer having a handle, flexible connections between the handle and the compressed air and water supplies, means operated by the compressed air and including a valve on the handle for creating a suction in the hydrometer as it is lowered into a battery to thereby draw up acid for testing, means including a second valve on the handle for venting the hydrometer to atmosphere to permit the return of the acid to the battery after testing, and means including a third valve on the handle for delivering water from the supply to the battery, all of said valves including finger pieces projecting from the handle and grouped for convenient operation by the hand manipulating the hydrometer.

9. In a battery testing and filling device for use in conjunction with supplies of compressed air and distilled water, a hydrometer having a chamber for receiving acid from the battery and leading to a spout for insertion into the battery, the hydrometer also having a duct leading to the spout, means operated by the compressed air for creating a suction in the hydrometer to pull acid up into the chamber, means for venting the chamber to atmosphere to allow the acid to return to the battery, and means for directing distilled water from said supply through the duct and into the battery.

10. In an apparatus for servicing storage batteries and for use in conjunction with a source of compressed air, the combination comprising a hydrometer, a hand piece for manipulating the hydrometer, a container for carrying a compressed air supply and a distilled water supply, flexible fluid carrying means connecting the handpiece to said container, means operated by the compressed air for creating a vacuum in the hydrometer to draw up acid from a battery for testing, means for shutting off the vacuum while a reading of the specific gravity is made, means then for venting the hydrometer to atmosphere to permit the acid to return to the battery, means operated by compressed air to supply water from the container to battery, and two hand-operated valves for controlling the last three mentioned means.

11. For testing and servicing storage battaries, an apparatus including a hydrometer and a hand piece thereon, flexible conduits for supplying compressed air and distilled water to the hand piece, and separate manually controlled valves in said hand piece for controlling the flow of air and water in such fashion as to create a suction in the hydrometer for testing a battery and for delivering water to the hydrometer when the battery needs filling.

12. For testing and servicing storage batteries, a portable apparatus comprising a hydrometer having a barrel and a hand piece by which it may be manipulated, flexible conduits for supplying compressed air and distilled water to the hand piece, the hand piece having an opening down into the barrel and a passage leading compressed air past said opening to create a suction in the barrel when testing a battery, a valve for controlling the air flow, a float for closing the opening into the barrel, means for venting the barrel to atmosphere, and a valve controlled means for supplying water to the battery being serviced.

13. For testing and servicing storage batteries, a portable apparatus comprising a hydrometer having a barrel and a hand piece by which it may be manipulated, flexible conduits for supplying compressed air and distilled water to the hand piece, the hand piece having an opening down into the barrel and a passage leading compressed air past said opening to create a suction in the barrel when testing a battery, a valve for controlling the air flow, a float for closing the opening into the barrel, means for venting the barrel to atmosphere, and a valve controlled means for supplying water to the battery being serviced, the hydrometer barrel having a downwardly opening duct in its wall for receiving water from said last mentioned means.

14. A portable apparatus for servicing storage batteries, comprising a hydrometer operative by compressed air for drawing electrolyte from a battery for testing, a portable compressed air tank, and a flexible conduit connecting the hydrometer and tank.

15. A portable apparatus for servicing storage batteries, comprising a hydrometer operative by compressed air for drawing electrolyte from a battery for testing, a portable compressed air tank, and a flexible conduit connecting the hydrometer and tank, the said hydrometer having also means for supplying water to a battery and the tank having a chamber for water and compressed air, and a separate flexible water conduit connecting the hydrometer and tank.

16. In a liquid testing device including a hydrometer chamber to determine the specific gravity of a liquid, means operated by compressed air and employing the Venturi effect through a system of tubes, channels and valves, to draw up the liquid to be tested into the hydrometer chamber for testing, with a means for releasing this liquid after it has been tested.

17. In a storage battery testing and servicing apparatus, a tank for the storage of distilled water under air pressure, a tank for the storage of compressed air, a hydrometer and means connecting these tanks to the hydrometer for testing the specific gravity of the electroylte in the battery, a means for drawing up the electrolyte into the hydrometer chamber, operated by compressed air, from the aforesaid storage tank, employing the Venturi effect through a system of tubes, channels and valves, a means for releasing this electrolyte from the hydrometer chamber, and a means for adding distilled water to the battery cell through the hydrometer from the aforesaid distilled water storage tank.

18. In a storage battery testing and servicing apparatus consisting of a hydrometer fastened to a handle connected to a source of compressed air and distilled water under pressure, a means in said handle for drawing up the electrolyte into the hydrometer chamber for testing, by the compressed air employing the Venturi effect through a system of tubes, channels, and valves, a means in said handle for releasing the electrolyte, and a means in said handle for adding distilled water to the battery cell through said hydrometer.

19. In a portable means for testing and servicing storage batteries and the like, a portable combination compartment tank, having a lower compartment for distilled water, with an outside vertical glass gauge showing the water level in the compartment; an upper compartment for holding compressed air, a double tube outlet means having one tube extending to the lower compartment of the water tank and the other tube extending to the upper compressed air compartment; an air inlet valve recessed in the tank extending to the water compartment for filling with compressed air, a screw-cap valve extending to the water compartment for filling with distilled water; an air valve inlet extending to the air compartment for filling with compressed air, a safety valve in connection with said air valve, and a handle means for ceneniently carrying tank.

HAROLD F. NELSON.

References Cited in the file of this patent

UNITED STATES PATENTS

| Number | Name | Date |
|---|---|---|
| 1,194,171 | Hamilton | Aug. 8, 1916 |
| 1,308,223 | Camp | July 1, 1919 |
| 1,358,827 | Case | Nov. 16, 1920 |
| 1,365,801 | Solomon | Jan. 18, 1921 |
| 1,448,142 | Martin | Mar. 13, 1923 |
| 1,559,421 | Greet | Oct. 27, 1925 |
| 1,602,518 | Bowerman | Oct. 12, 1926 |
| 1,611,259 | Wogenstahl | Dec. 21, 1926 |
| 1,618,894 | Smock | Feb. 22, 1927 |
| 1,820,552 | Wooley | Aug. 25, 1931 |
| 2,205,495 | Schmitt | June 25, 1940 |
| 2,441,700 | Hammell | May 18, 1948 |
| 2,488,946 | Turpin | Nov. 22, 1949 |

FOREIGN PATENTS

| Number | Country | Date |
|---|---|---|
| 328,774 | Great Britain | May 8, 1930 |
| 429,612 | Great Britain | June 4, 1935 |